July 30, 1968 LONG SUN TONG ET AL 3,395,077
FUEL ASSEMBLY FOR NUCLEAR REACTORS
Filed May 25, 1966 2 Sheets-Sheet 1

INVENTORS
Long Sun Tong &
Robert T. Berringer
BY
A. J. Santantonio
ATTORNEY

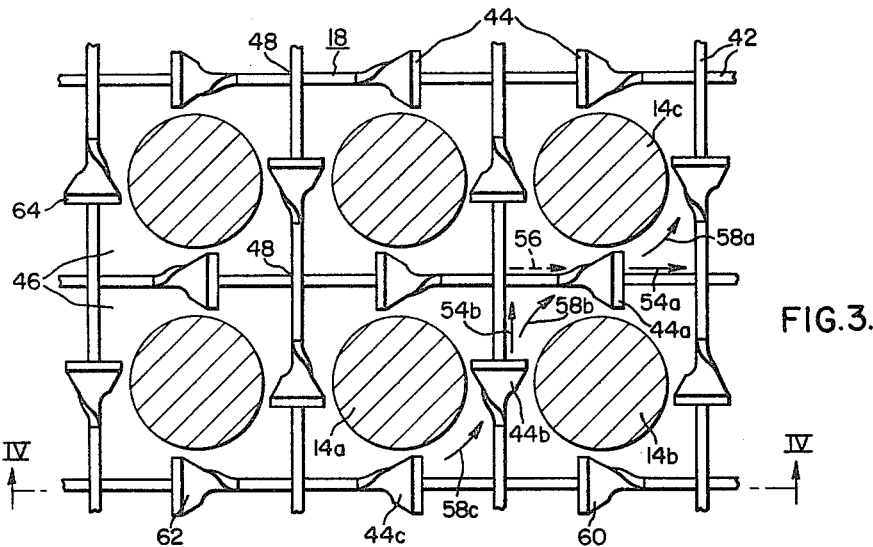
FIG.3.
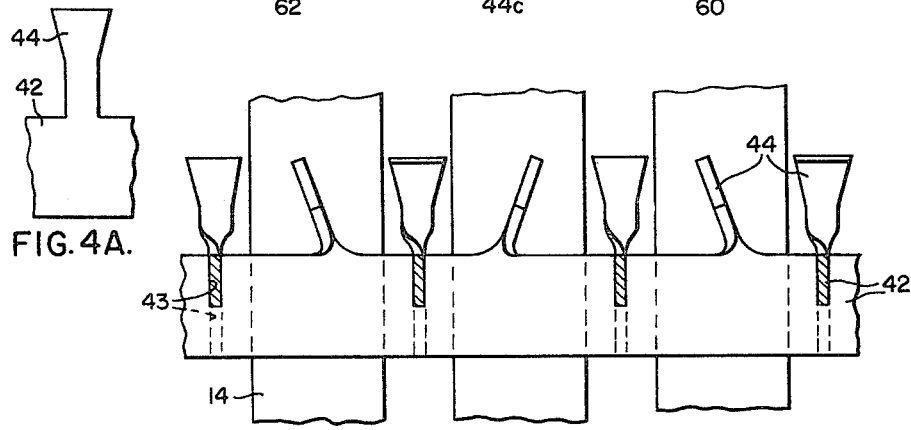
FIG.4A.
FIG.4.
FIG.5A.
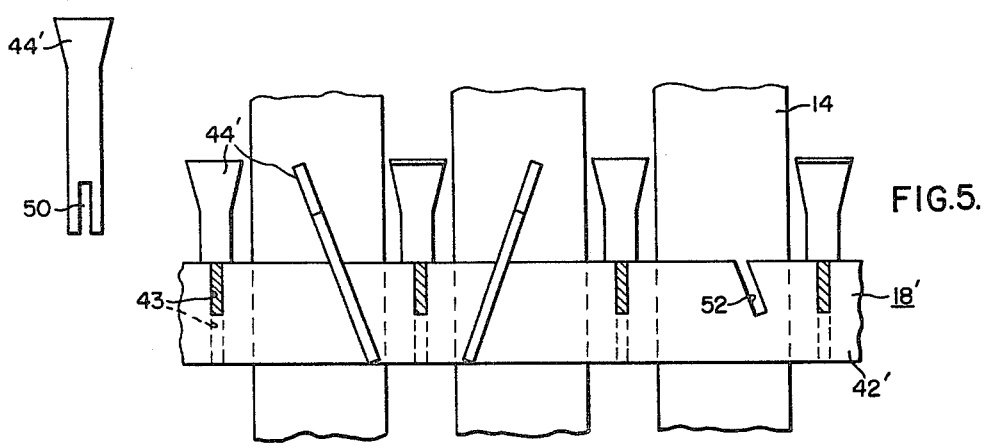
FIG.5.

United States Patent Office 3,395,077
Patented July 30, 1968

3,395,077
FUEL ASSEMBLY FOR NUCLEAR REACTORS
Long Sun Tong, Pittsburgh, and Robert T. Berringer, Monroeville, Pa., assignors to Westinghouse Electric Corporation, Pittsburgh, Pa., a corporation of Pennsylvania
Filed May 25, 1966, Ser. No. 552,899
12 Claims. (Cl. 176—78)

ABSTRACT OF THE DISCLOSURE

A fuel assembly for a nuclear reactor containing a plurality of spaced parallel fuel elements is provided with means for promoting the mixing of the coolant flowing along coolant channels formed between adjacent fuel elements. A grid structure having openings therein through which the fuel elements extend is provided with generally planar mixing vanes or coolant deflecting means extending from the grid such that the plane of the deflecting means extends laterally across at least a portion of the adjacent coolant channel. In this manner, mixing of coolant flowing through separate coolant channels is achieved thereby promoting an outlet coolant flow wherein substantially all of the coolant exits from the fuel assembly at substantially the same temperature.

The present invention relates to a fuel assembly for a nuclear reactor and, more particularly, to the distribution of coolant flow therethrough.

The power output of a nuclear reactor is limited by the rate at which heat can be removed from the reactor core, and the rate of heat transfer determines the temperatures developed in a reactor core. Therefore, the maximum reactor operating power is limited by some enthalpy and/or temperature value in the reactor core.

One general structural form commonly used for providing a nuclear fuel inventory in nuclear reactors is that in which a plurality of elonagted nuclear fuel elements or rods containing nuclear material are arranged, within a prescribed volume, in a parallel array in an upstanding direction between the upper and lower reactor core support plates. To provide integrity in the support relations, the fuel rods are divided into groups; and the rods in each group are formed as a fuel assembly prior to placement between the reactor core support plates. A fluid coolant having, if desired, neutron moderating properties, flows longitudinally along and among the fuel rods as a vehicle for energy transfer.

The variation of the neutron flux in the reactor core causes the fuel assemblies in the core to operate at different power levels, and this variation occurs even among the fuel rods within a single fuel assembly. The power variation results in variations in the enthalpy rise of the coolant among the different coolant flow channels throughout the reactor core. The existence of fabrication tolerances requires the use of an engineering tool known as a "hot channel factor" to account for the effect of these tolerances, and it is assumed that the greatest tolerance variation occurs in the flow channel where the neutron flux is also a maximum. Therefore, the hot channel factor is used to design a reactor core in which the temperature attained by the core material during steady state and transient operating conditions will not exceed the design temperature of the core material. As the reactor core must be designed for safe operating conditions in the hot channel, the enthalpy rise of the coolant in the "hot" channel directly affects the maximum available power which can be obtained from the reactor core. Since the enthalpy rise of the coolant in the hot channel may be 2½ to 3 times the average enthalpy rise in the reactor core, a reduction in the ratio of the enthalpy rise of the hot channel to the enthalpy rise of the average channel results in a proportional increase in reactor core power.

It is highly desirable to mix flow from one flow channel to another. Previous designers have utilized spirally wrapped wires to laterally space the fuel rods and have obtained a beneficial secondary effect by the spiral mixing that occurred in the coolant. However, spirally wrapped fuel rods develop a high pressure drop across the reactor core and produce only a gradual mixing or the coolant. Furthermore, the utilization of the same device to both space the fuel rods and produce a spiral coolant mixing places limitations on the mixing patterns that can be used.

Accordingly, it is the general object of this invention to provide a new and improved nuclear fuel assembly for producing lateral mixing.

Another object of this invention is to provide a novel means for reducing the enthalpy rise of the coolant in the "hot" flow channels.

Still another object of this invention is to provide a novel means for maintaining a more uniform coolant tempertaure laterally across a core having a longitudinal coolant flow path.

A further object of this invention is to produce a lateral coolant flow between adjacent fuel rods and thereby induce mixing of the coolant flow between flow channels.

A still further object of this invention is to provide a fuel assembly arrangement which produces a lateral coolant flow to induce coolant cross flow and mixing across a fuel assembly.

Briefly, the present invention accomplishes the above cited objects by providing a coolant mixing device in the fuel assembly to laterally mix the coolant flowing longitudinally among the fuel elements or rods in the fuel assembly. The aforementioned result is accomplished by a grid member which has mixing vanes protruding into the coolant flow channels formed by the parallel array of fuel rods. The mixing vanes are disposed between the fuel rods and deflect the longitudinal coolant flow in a lateral direction thereby producing a mixing of the coolant among the longitudinal flow channels. Thus, the coolant in a flow channel having a higher enthalpy and/or temperature is mixed with the coolant in another flow channel having a lower enthalpy and/or temperature to produce a coolant mixture having an average temperature, which is intermediate the aforementioned higher and lower values.

More specifically, the nuclear fuel assembly comprises a plurality of elongated parallel fuel rods, which are supported and laterally positioned by the elongated frame means including lateral supporting means. At least one grid member extends laterally across the frame means and has openings through which respective fuel rods extend. The openings in the grid member are formed by a plurality of straps, which are interfitted to provide a structural network, similar to an "egg crate." The grid straps, in turn, are provided with mixing vanes which protrude into their adjacent flow channels to laterally deflect the longitudinal coolant flow. In order to deflect the longitudinal coolant flow, each vane may be cantilevered in a longitudinal direction from the edge of a strap. In addition, each vane may also be bent at a predetermined angle from the vertical axis of the fuel assembly so as to protrude into at least one of the adjacent flow channels. The final configuration of each mixing vane is such that each vane is located between adjacent fuel rods without interfering with the passage of the fuel rods through the grid member. This invention, therefore, uses a means of promoting lateral coolant mixing between adjacent channels independent of other functions. Also, since the mixing vanes are wider than spiral wires, more and better coolant mixing is effected.

These and other objects and advantages of the present invention will become more apparent when considered in view of the following detailed description and drawings, in which:

FIG. 3 is an enlarged portion of FIG. 2 to show the vanes with greater clarity and is taken from the portion of FIG. 2 having the cross-sectional fuel rods;

FIG. 4 is a longitudinally sectioned view of a portion of a grid member and is taken along reference line IV—IV of FIG. 3 to show the vertical relationship of the vanes with reference to the grid member and the fuel rods;

FIG. 4A is an elevational view of a portion of a strap and its upwardly extending vane before the vane has been twisted and deflected;

FIG. 5 is another embodiment of FIG. 4 showing another method of combining the vanes with the grid member;

FIG. 5A is an elevational view of a mixing vane prior to its insertion into the strap.

Figure 1:
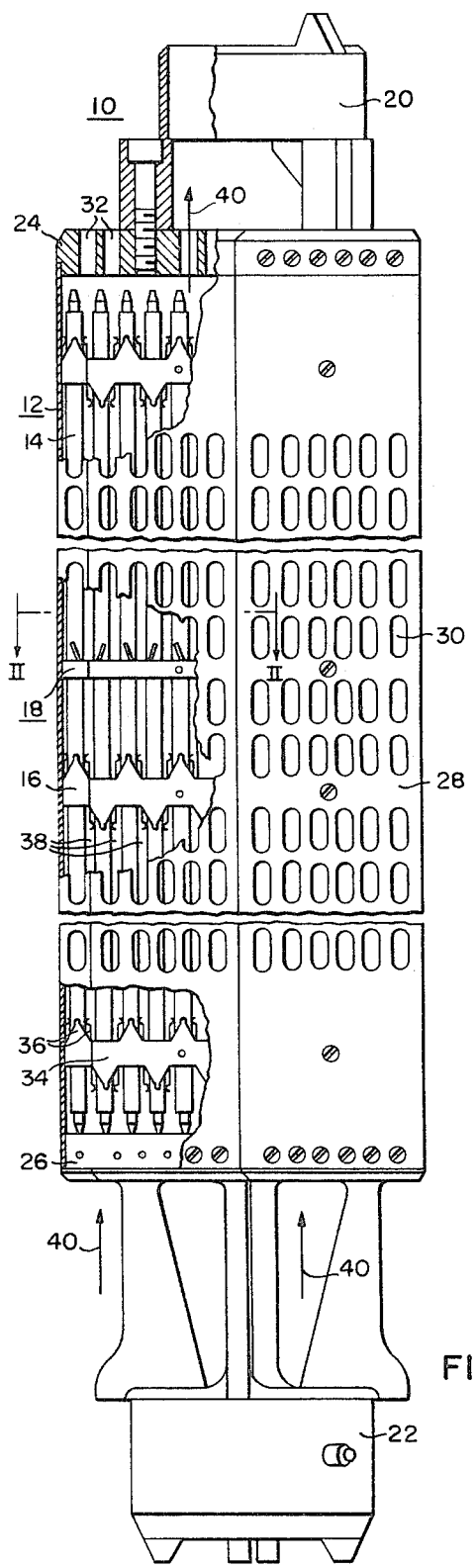
FIG. 1 is a partially sectioned elevational view, with parts broken away for clarity, of a fuel assembly formed in accordance with the principles of this invention.

Referring now to FIGURE 1 there is shown a fuel assembly 10 comprising a frame means 12, a plurality of fuel elements 14 located within the frame means 12, a plurality of grid members 16 for laterally positioning the fuel elements 14, and a plurality of mixing vanes structures or grids 18, only one of which is shown, for laterally deflecting the longitudinal coolant flow in the fuel assembly 10.

In this embodiment, the frame means 12 includes an upper end nozzle 20, a lower end nozzle 22, an upper end plate 24, a lower end plate 26, and an enclosure or can 28. Upper and lower end nozzles 20 and 22 are secured to upper and lower end plates 24 and 26, respectively. The enclosure 28, in turn is secured to the upper and lower end plates 24 and 26. The fuel elements 22 are disposed within the enclosure 28 and rest on the lower end plates 26. Flow openings 30 are provided in the enclosure 28 so as to permit cross flow of the employed coolant. Flow openings 32 are provided in the upper end plate 24, and similar flow openings (not shown) are also provided in the lower end plate 26 to permit coolant flow longitudinally through the fuel assembly 10. The upper and lower end nozzles 20 and 22 are inserted into their associated openings in the upper and lower reactor core support plates, respectively, (not shown). The material selected for use in forming the enclosure 28 should be provided maximum structural strength consistent with low neutron absorption cross section, as for example stainless steel or a zirconium alloy.

The positioning member 16 is secured to and extends laterally across the enclosure 28 for the purpose of providing lateral support for the fuel elements 14. A plurality of positioning members 16 are longitudinally spaced from each other and secured to the enclosure 28 to provide sufficient lateral support for the fuel elements 14. Each positioning member 16 is comprised of a plurality of straps 34 which are interwoven in a grid like manner. A plurality of spring tabs 36 extend longitudinally from both edges of each strap 34. The spring tabs 36 are located in groups of four so as to engage each fuel element 14 on four sides in the same transverse plane, thereby positioning each fuel element 14 in a transverse direction. For additional information on the positioning members 16, reference is made to copending application Serial No. 156,370, entitled "Fuel Arrangement For A Nuclear Reactor," filed Dec. 1, 1961, now Patent No. 3,255,091, by Erling Frisch and assigned to the present assignee.

The mixing vane structure or grid 18 is utilized for the purpose of directing a lateral flow of coolant laterally across adjacent fuel elements 14, thereby inducting coolant flow mixing between at least adjacent flow channels 38. A plurality of mixing vane grids 18 are secured to the enclosure 28 and are longitudinally spaced from each other with each mixing vane grid 18 located intermediate a pair of positioning members 16. For example, the positioning members 16 may be located on a longitudinal pitch of approximately 11 inches, with a total of nine longitudinally spaced positioning members 16 per assembly. Assuming that the coolant flows in an upward longitudinal direction as indicated by flow arrows 40, each mixing vane grid 18 may be located approximately three inches downstream of its associated positioning member 16.

It will be appreciated that the longitudinal location and pitch of the mixing vane grids may be optimized for each fuel assembly design. The location should allow for maximum mixing downstream before mixing paths are broken up by another resistance means, such as a positioning grid. The location of the mixing vane grid should also be free from adverse upstream conditions. Further, adverse coupling effects, for example, vibration and pressure losses, should be avoided when locating the positioning grids. Although a mixing vane grid 18 can be used in combination with each positioning member 16, only five mixing vane grids 18 are utilized in each fuel assembly 10, as no mixing vane grids 18 are used, in this example, intermediate the three lowermost and two uppermost positioning members 16. The mixing vane grids 18 are not used between the three lowermost positioning members, because the coolant has a relatively low temperature in this region and does not require lateral mixing. The mixing vane grid 18 is not used between the two uppermost positioning members, because the coolant is reaching the end of its longitudinal travel through the fuel assembly 10 and is not subjected to an appreciable temperature rise in the upper portion of the fuel assembly 10. Also the heat flux and fuel temperatures adjacent the exit end of the fuel assembly are relatively lower. Therefore, the inducement of additional lateral flow mixing adjacent the exit end is not deemed necessary in this example.

Figure 2:
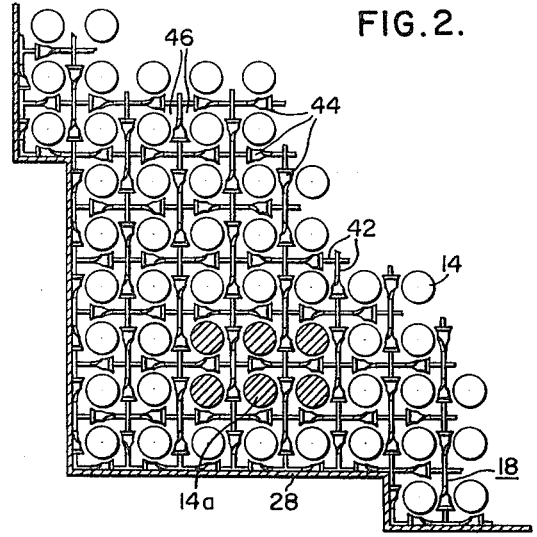
FIG. 2 is an enlarged partial cross-sectional view of the fuel assembly of FIGURE 1 and is taken along the reference line II—II of FIGURE 1 to show the mixing vane pattern.

As viewed in FIGS. 2, 3 and 4, the mixing vane grid 18 is comprised of a plurality of straps 42 which are interwoven in a grid like manner. Generally, the strap configuration of mixing vane grid 18 is similar to that described in the aforementioned copending application, and specific description of the grid 18 is limited herein to that subject matter which pertains to the present invention. Thus, it is to be noted that the straps 42 are interfitted through the use of opposing latching means or slots 43 (FIG. 5), which allow the straps 42 to be interlatched at each intersection 48. When the straps 42 and their associated mixing vanes 44, to be described in greater detail hereinafter, have been preassembled as described, the entire mixing vane grid is permanently secured together, for example through the use of a furnace brazing operation or by welding. The mixing vane grids 18 and the positioning members 16 are then welded or otherwise secured to the enclosure 28 so as to be suitably supported. In turn, both the positioning members 16 and mixing vane grids 18 contribute to rigidizing the enclosure 28.

The grid 18 is provided with openings 46 for receipt of the fuel rods 14. Further, each strap 42 is provided with a plurality of cantilevered mixing vanes 44, with both the mixing vanes and the strap 42 being in the same vertical plane (FIG. 4A). Each mixing vane 44 is then laterally twisted until it extends substantially perpendicular to the aforementioned vertical plane of the strap 42. The vane is also deflected from its vertical axis to an acute angle of 20° to 40°, and preferably 28° to 30°, from the vertical axis of the fuel assembly, as shown in FIG. 4. It is to be noted that the outer end portion of the mixing vane 44 is wider than its base, with the end portion extending over two adjacent flow openings 46 as shown in FIG. 3. Each vane 44 is located intermediate two adjacent strap intersections 48, with four mixing vanes 44 surrounding each fuel rod 14. The four mixing vanes 44 are all inclined in a single peripheral direction; for example, either a clockwise or counterclockwise direction around each fuel rod 14.

In FIG. 5, there is shown a mixing vane grid 18', which is a different embodiment of the mixing vane grid 18 shown in FIG. 4. Mixing vane grid 18' is assembled by interfitting mixing vane 44' with a strap 42' through the use of opposing latching means or slots 50 and 52 in the mixing vane 44' and the strap 42', respectively. The slot 52 in the strap 42' is formed at the same angle as described above for mixing vane 44 in FIG. 4. The straps 42' are also interfitted through the use of opposing slots 43 which allow the straps 42' to be interlatched at their various intersections 48 (FIG. 3). After the mixing vane grid 18' has been preassembled as described, the entire assembly is permanently secured together, for example through the use of a furnace brazing operation.

Figure 6:
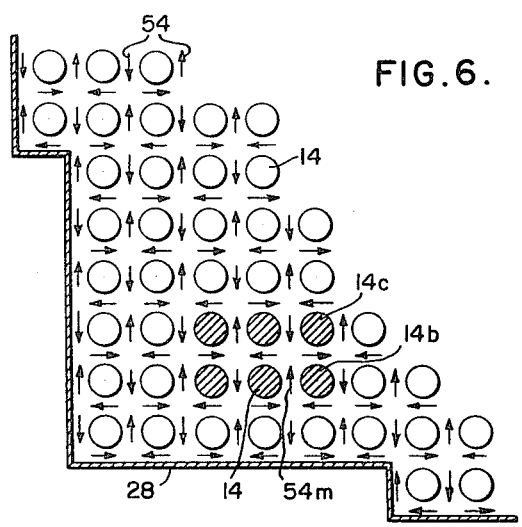
FIG. 6 is a partial plan view showing the lateral flow pattern imparted to the longitudinally flowing coolant, when the latter is deflected by the mixing vanes illustrated in FIG. 2 with the same fuel rods being cross-sectioned in both figures.

Referring now to FIG. 6, there is shown the lateral flow pattern, as indicated by flow arrows 54, imparted to the coolant flowing longitudinally through the fuel assembly 10, when the coolant is deflected by the mixing vanes 44 illustrated in FIG. 2. Looking now specifically at fuel rods 14a and 14b, the coolant is shown to be laterally deflected in a counterclockwise direction around fuel rod 14a and in a clockwise direction around fuel rod 14b. The two aforementioned patterns then mesh, in a manner similar to gears, at lateral flow arrow 54m thereby inducing a mixture of the coolant between the two adjacent flow channels surrounding fuel rods 14a and 14b. Thus, if the coolant in one of the flow channels has a higher enthalpy than the coolant in the other flow channel, the resulting coolant mixture will have an average enthalpy which is intermediate the aforementioned higher and lower enthalpies. It is understood, of course, that the aforedescribed lateral coolant flow pattern occurs as the coolant is passing longitudinally through the fuel assembly 10, as indicated by flow arrows 40 (FIG. 1).

Returning now to FIG. 3, there is shown that the coolant flowing upwardly along fuel rods 14b and 14c and to the right of mixing vane 44a will be deflected to the right by mixing vane 44a, as indicated by the lateral flow arrow 54a. The aforementioned lateral displacement of coolant produces a lower pressure to the right of mixing vane 44a than the pressure to the left of mixing vane 44a. Therefore, upwardly flowing coolant to the left of mixing vane 44a is induced to flow laterally to the right, as indicated by dotted flow arrow 56. Simultaneously, mixing vane 44b deflects the coolant laterally as shown by flow arrow 54b. However, a portion of the coolant flowing laterally as indicated by arrow 54b is induced to flow towards mixing vane 44a and follows a resultant flow path indicated by flow arrow 58b. Therefore, it can readily be seen that a portion of the upwardly flowing coolant, which is first laterally deflected by mixing vane 44c follows a generally diagonal flow path laterally across the fuel assembly 10, as indicated by resultant flow arrows 58c, 58b and 58a. Of course, the aforementioned coolant portion will follow the diagonal flow path while simultaneously flowing longitudinally through the fuel assembly 10. Thus the aforementioned coolant portion will first come in contact with mixing vane 44c on the lowermost grid mixing vane 18 and then come in contact with mixing vanes 44b and 44a on successive grids 18 disposed above the lowermost grid 18.

The aforedescribed diagonal flow effect can be increased, if the mixing vanes 44 in diagonal rows 60, 62 and 64 are eliminated, or else, if the latter mixing vanes 44 have the same orientation as mixing vanes 44c, 44b and 44a.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What is claimed as new is:

1. A fuel assembly for a nuclear reactor comprising a plurality of elongated fuel elements disposed in a generally parallel spaced array and forming a plurality of longitudinal coolant flow channels between adjacent fuel elements, a plurality of spaced grid structures disposed in longitudinally spaced relationship along said fuel elements and extending laterally therefrom, said grid structures having aligned openings through which said fuel elements extend and having portions thereof in each of said flow channels, means for supporting said fuel elements and said grid structures, cantilever deflecting means mounted on said grid structures for laterally deflecting at least a portion of a generally longitudinal coolant flow between at least adjacent flow channels said deflecting means each including a generally planar portion with the plane of said portion extending in a lateral direction across an adjacent one of said flow channels, and each of said deflecting means having one end secured to said grid structure and a free end spaced from each adjacent fuel element.

2. The fuel assembly of claim 1 wherein said coolant deflecting means is positioned to deflect at least a portion of said coolant laterally across at least a portion of said fuel assembly as said coolant flows generally longitudinally through said fuel assembly.

3. The fuel assembly of claim 2 wherein said coolant deflecting means is formed to deflect at least a portion of said coolant in a generally diagonal direction across at least a portion of said fuel assembly.

4. The fuel assembly of claim 1 wherein at least some of said coolant deflecting means are each formed to deflect at least a portion of said coolant flow from adjacent flow channels into an interlacing mixture of coolant from said adjacent flow channels in a manner similar to gears meshing together.

5. The fuel assembly of claim 1 wherein each of said grid structures comprises a plurality of rigidly interengaged straps, said straps forming said portions of said flow channels, and wherein said coolant deflecting means are coolant mixing vanes cantilevered longitudinally from the edges of said straps and protruding into said flow channels.

6. A grid structure for a nuclear reactor fuel assembly containing a plurality of elongated fuel elements in a generally parallel array, said grid structure comprising a plurality of connecting members forming respective openings through which said fuel elements are adapted to extend, said grid structure having one dimension thereof extending generally parallel to the longitudinal dimension of said fuel elements and a plurality of generally planar coolant deflecting means cantilevered from said connecting members and protruding into some of said openings with the plane of said deflecting means and extending laterally at a predetermined angle from with respect to said one dimension.

7. The grid structure of claim 6 wherein said acute angle is from 20° to 40°.

8. The grid structure of claim 6 wherein said connecting members are cross-laced rigidly interengaged straps, and wherein said coolant deflecting means are vanes disposed intermediate the intersections of said straps.

9. The grid structure of claim 6 wherein said coolant deflecting means extend over each of some openings by groups of four.

10. The grid structure of claim 9 wherein said coolant deflecting means in each of said groups are bent at said predetermined angle in the same peripheral direction around each respective opening.

11. The grid structure of claim 8 wherein said vanes are wider at their outward ends than at the straps, and said vanes are disposed between adjacent fuel elements.

12. The grid structure of claim 6 wherein all of the coolant deflecting means at the periphery of said grid structure are deflected laterally inwardly of said straps.

References Cited

UNITED STATES PATENTS

| | | | |
|---|---|---|---|
| 3,068,163 | 12/1962 | Currier et al. | 176—78 |
| 3,070,537 | 12/1962 | Treshow | 176—61 X |
| 3,185,632 | 5/1965 | Bradley | 176—78 X |
| 3,205,147 | 9/1965 | Foure et al. | 176—64 X |
| 3,228,854 | 1/1966 | Bekkering et al. | 176—78 |
| 3,255,090 | 6/1966 | Leirvik | 176—76 |
| 3,255,091 | 6/1966 | Frisch | 176—78 |
| 3,308,031 | 3/1967 | Pon | 176—78 X |
| 3,344,855 | 10/1967 | Clark | 176—78 X |

FOREIGN PATENTS

| | | |
|---|---|---|
| 973,137 | 10/1964 | Great Britain. |
| 1,014,822 | 12/1965 | Great Brtain. |

CARL D. QUARFORTH, *Primary Examiner.*

M. J. SCOLNICK, *Assistant Examiner.*